June 24, 1958 J. R. HOLLINS 2,840,796
VEHICLE SIGNALLING CIRCUIT
Filed March 16, 1953
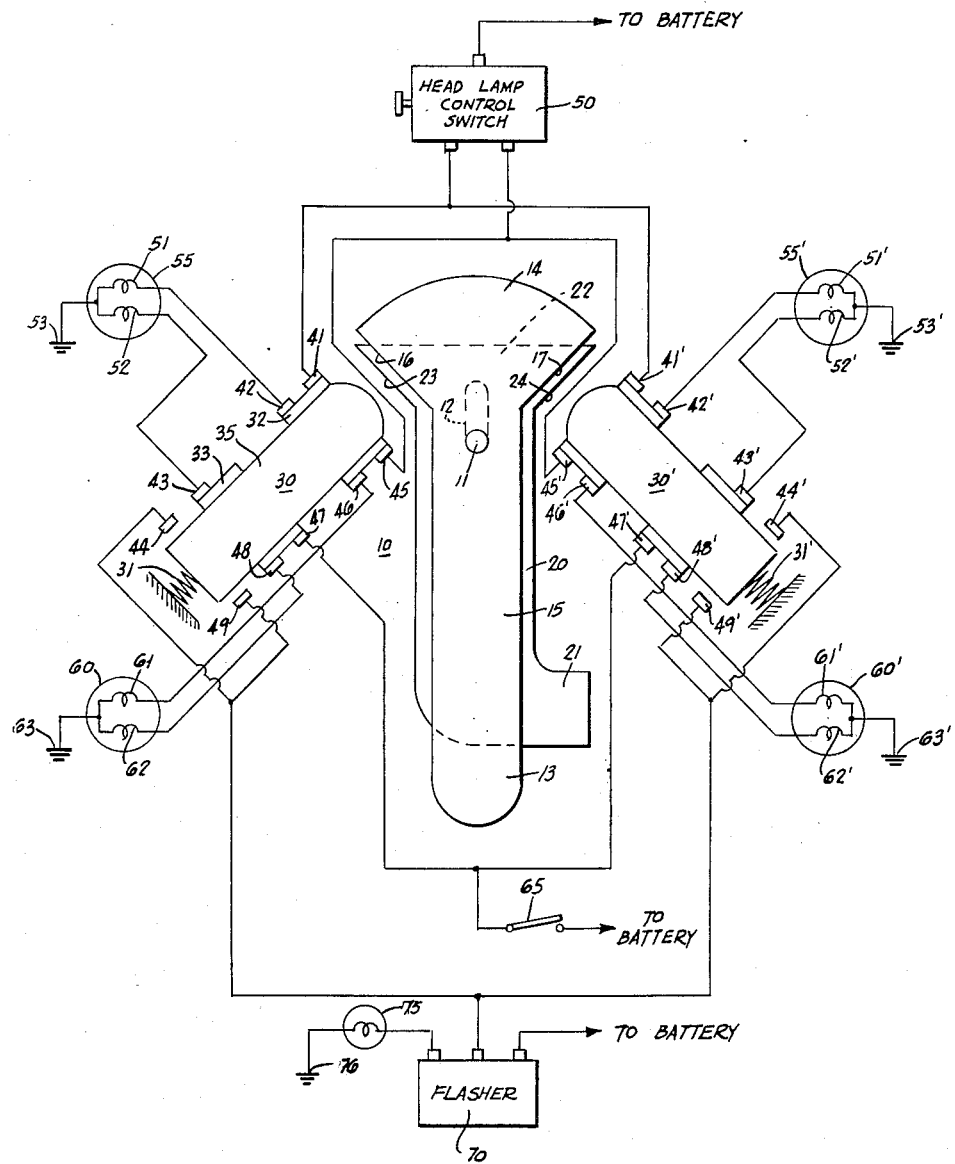
INVENTOR.
Jesse R Hollins
BY
ATTORNEY

United States Patent Office 2,840,796
Patented June 24, 1958

2,840,796

VEHICLE SIGNALLING CIRCUIT

Jesse R. Hollins, Brooklyn, N. Y., assignor, by mesne assignments, to Abraham Hollins and Jesse R. Hollins, Brooklyn, Lewis S. Hollins, Great Neck, and Theodore D. Davidson, New York, N. Y.

Application March 16, 1953, Serial No. 342,526

2 Claims. (Cl. 340—81)

This invention relates to signalling circuits for automotive vehicles and, more particularly, to a novel signalling circuit using the usual parking lamps and stop lamps as signalling elements but providing a much more distinctive and sharper signal when signal control means are actuated.

It is now conventional practice to equip automotive vehicles with selectively operable lamp flashing circuits so that the driver can signal a proposed turn. For example, to signal a left turn, a pair of lamps on the left side of the vehicle, one at the front and the other at the rear, are energized through a flasher to provide a flashing signal to approaching or following vehicles. Generally, this is effected by moving a turn indication selector lever which operate appropriate switches to flashingly energize either the right side lamps or the left side lamps.

For reasons of practicality and economy, the turn signalling lamps are usually incorporated in the compartments for the parking lamps and the tail or stop lamps, which latter are sometimes combined in a single unit. Such incorporation is effected by the use of two-filament lamps, having a first filament energized through the headlamp control switch or the brake-operated "stop" switch, and a second, and brighter, filament selectively connectable through the turn signalling switch to a flasher.

Under normal conditions, the lamps glow steadily when the headlamp switch is on, or the stop lamp(s) is steadily illuminated when the brake is operated. When the turn signalling switch is operated, the second filaments of the desired lamps are flashingly energized at a higher level of illumination than provided by the steady energization of the first filaments.

Consequently, in signalling a change in direction, the level of illumination of the lamps on one side of the vehicle is raised, as compared to the level of illumination of the lamps on the other side of the vehicle. Additionally, the lamps on one side are flashed while those on the other side burn steadily.

As a result, the turn signal provided is merely a difference in degree of illumination plus an intermittent flashing. In other words, the turn signalling lamps merely go from a relatively dim condition to a brighter condition.

The resulting signal transmitting effect is not sufficiently impressive on the drivers of other cars, being relatively indistinct due to representing merely a change in illumination. The indistinctness of the signalling effect is even more pronounced with respect to the tail or stop lamps as compared to the front-mounted parking lamps, as the tail and stop lamps, whether individual or combined, are provided with red lenses which even further reduce the perceived illumination level.

In accordance with the present invention, a novel signalling circuit and novel switch are utilized to provide a much more distinctive and easily perceived warning signal, while utilizing the usual two-filament lamp arrangement. To this end, the switch includes normally closed circuit controlling contacts interposed between the parking lamp control switch and the parking and tail lamps, and normally closed circuit controlling contacts interposed between the brake-operated switch and the stop lamps. The switch further includes normally open circuit controlling contacts included in the energizing circuit of each of the directional signal lamps or filaments.

The opening and closing of the aforementioned contacts is effected by movable elements or operators which are selectively actuable by the directional signalling control lever. When the latter lever is operated to signal a turn in a selected direction, the corresponding element is actuated to open the circuit between the parking, tail and stop lamps or filaments and their respective normal control switches, on the corresponding side of the vehicle, and to connect the turn signalling lamps or filaments, preferably including the stop lamp filaments, on such side to a flasher. The normal control circuits of the parking, tail and stop lamps or filaments on the opposite side of the vehicle remain unchanged.

Thus, the parking and tail lamps or filaments on the one side of the vehicle are extinguished, while the brighter turn signalling lamps or filaments, including the stop lamp or filaments, on such side are flashingly energized. Thereby, the effectiveness of the flashing signal lamps or filaments is not reduced by virtue of any steady burning lamp or filament in the same lamp compartment. The flashing illumination intermittently varies from zero illumination to a high level of illumination, rather than from a low level of illumination to a higher level. The contrast of the illumination is accordingly sharply increased, providing a much more distinct warning signal.

Preferably, the invention control switch further incorporates a flare control lever for flashing all the signal lamps to indicate an emergency stop. A flare switch lever suitable for use in the invention switch is shown in my copending applications, S. N. 259,473 or S. N. 259,474, filed Dec. 1, 1951, for "Vehicle Directional and Emergency Parking Signal Control System," now U. S. Patent No. 2,667,603, dated January 26, 1954, and U. S. Patent No. 2,667,627, dated January 26, 1954, respectively. The flare lever, when operated, actuates both switch elements to disconnect all the parking, tail and stop lamps or filaments from their usual control switches and to connect all the signal and stop lamps or filaments to the flasher. Thereby, all the vehicle warning lamps are flashed on and off, rather than being merely varied in effective illumination.

For an understanding of the invention principles, reference is made to the following description of a typical embodiment thereof as illustrated in the accompanying drawing. In the drawing, the single figure is a schematic wiring diagram of a vehicle signal lamp circuit embodying the invention control arrangement and switch.

Referring to the drawing, the invention is illustrated, by way of example only, as incorporated in a vehicle signalling system in which two-filament lamps are utilized to provide a parking lamp and a signalling lamp in the same compartment, and two-filament lamps are used to provide a combined stop and tail lamp unit. The control switch 10, which in practice is mounted on a suitable base or enclosed in a suitable housing, is provided with a swingably mounted selector lever 15 controlling the turn signalling and a reciprocably mounted "flare" lever 20 operable to flash all the signal lamps at once.

Lever 15 may be swingably mounted on a pivot pin or shaft 11, which also extends through an elongated slot 12 in lever 20 permitting longitudinal reciprocation of the latter. Lever 15 includes an elongated operating handle 13 and an enlarged switch operating head 14 which is preferably substantially sector shaped about pin 11 as a center and includes switch operating or camming surfaces 16 and 17.

Lever 20 may be normally spring biased to the position shown or may be merely releasably latched in either extreme position. This lever has a lateral offset 21 at its lower end which may be grasped by the operator to operate the "flare" control. At its opposite end, lever 20 has a substantially triangular operating head 22 with switch operating or camming surfaces 23, 24 substantially parallel, respectively, to surfaces 16 and 17 of lever 15.

On either side of levers 10 and 15 are the signalling control switches 30 and 30', which are identical in construction so that only one will be described in detail. Switch 30 includes a longitudinally movable elongated carrier 35, of dielectric material, which is aligned for movement perpendicularly to surface 23 of head 22 and camming surface 16. Spring 31 normally biases carrier 35 toward surfaces 16 and 23.

On one side surface, carrier 35 is provided with longitudinally spaced contact strips 32 and 33, and on its other side is provided with longitudinally spaced contact strips 34 and 36. Strip 32 normally engages and interconnects contacts 41 and 42, strip 33 normally engages contact 43, strip 34 normally engages and interconnects contacts 45 and 46, and strip 36 normally engages and interconnects contacts 47 and 48. On movement of carrier 35 by either surface 16 or 23, strip 32 disengages contact 41 and strip 33 interconnects contacts 43 and 44. Upon the aforesaid movement of carrier 35, strip 34 disengages contact 45, and strip 36 disengages contact 47 and interconnects contacts 48 and 49.

Contacts 41 and 41' are connected in parallel to the parking lamp tap of headlamp control switch 50 which, in turn, is connected to the vehicle battery and generator. Contacts 45 and 45' are connected to the tail tap of switch 50. Contacts 42 and 42' are connected to the parking lamp filaments 51, 51' of front mounted lamp units 55, 55', each on a different side of the vehicle. Each such lamp unit includes a second and considerably brighter signal lamp filament 52, 52' respectively connected to contacts 43 and 43'. The two filaments of each lamp unit are commonly grounded as at 53 or 53'.

Contacts 46, 46' are respectively connected to the tail lamp filaments 61, 61' of combined stop and tail lamp units 60, 60' of combined stop and tail lamp units 60, 60' mounted on either side of the rear of the vehicle. These units include second and considerably brighter stop lamp filaments 62, 62' respectively connected to contacts 48, 48'. The two filaments of each unit are commonly grounded as at 63, 63'.

Contacts 47, 47' are connected in parallel to the usual brake-operated switch 65 which is, in turn, connected to the vehicle battery and generator. Contacts 44, 44', 49, 49' are connected in parallel to a flasher 70 which is, in turn, connected to the vehicle battery and generator. A pilot lamp 75, grounded at 76, is connected to a relay in flasher 70, in the usual manner, to be flashed in synchronism or in alternation with the signal lamps when the latter are energized.

The operation of the invention switch and system is as follows: In the position of the levers 15, 20 and carriers 35, 35' illustrated in the drawings, parking lamp filaments 51, 51' are connected to headlamp control switch 50 through contacts 42, 42', conductive strips 32, 32' and contacts 41, 41'. Similarly, tail lamp filaments 61, 61' are connected to switch 50 through contacts 46, 46', conductive strips 34, 34' and contacts 45, 45'. Also stop lamp filaments 62, 62' are connected to brake-operated switch 65 through contacts 47, 47', conductive strips 36, 36' and contacts 48, 48'. This is the normal switch 10 position in which, when switch 50 is operated to the parking lamp position, lamp filaments 51, 51' and 61, 61' burn with a steady illumination and, when switch 65 is closed, filaments 62, 62' are steadily illuminated.

If a left turn is to be signalled, lever 15 is moved counter-clockwise so that surface 16 moves carrier 35 to compress spring 31. Filaments 51 and 61 are thereby disconnected from switch 50 as strip 32 disengages contact 41 and strip 34 disengages contact 45. Filament 62 is disconnected from switch 65 as contact strip 36 disengages contact 47. However, the right side filaments remain in their normally connected, and steady burning relation, as carrier 35' has not been moved.

As carrier 35 moves outwardly, strip 33 interconnects contacts 43 and 44, and strip 36 interconnects contacts 48 and 49. Signal lamp filament 52 is now connected to flasher 70 through contacts 43, 44 and strip 33, and stop lamp filament 62 is connected to the flasher through contacts 48, 49 and strip 36. Hence, these brighter filaments on the left side of the vehicle are energized and deenergized by flasher 70. As filaments 51 and 61 are deenergized, the illumination of units 55 and 60 varies between zero and enhanced brilliance, providing a sharply contrasted flashing signal. The right side lamps meanwhile burn steadily, if illuminated.

A corresponding effect is obtained when lever 15 is swung clockwise from normal or neutral to signal a right turn. For an emergency stop or parking, flare lever 20 is grasped at abutment 21 and pulled downwardly. This moves both carriers 35, 35' outwardly, by engagement thereof by surfaces 23, 24, to connect both signal lamp filaments 52, 52' and both stop lamp filaments 62, 62' to flasher 51, 51' from switch 50 and filaments 62, 62' from switch 65. Hence, all the signal lamps are flashed between zero illumination and a high level of illumination, providing an effective warning signal.

While a specific embodiment of the invention has been shown and described in detail to illustrate the application of the invention principles, it will be understood that the invention may be embodied otherwise without departing from such principles.

What is claimed is:

1. In a vehicle signaling system; a pair of parking lamp means; a pair of signal lamp means; one parking lamp means and one signal lamp means being grouped on each side of the front of the vehicle; a pair of tail lamp means; a pair of stop lamp means; one tail lamp means and one stop lamp means being grouped on each side of the rear of the vehicle; a parking and tail lamp control switch; a stop lamp switch; a pair of turn signal switches each having a normal position and an operated position; means for selectively operating either of said turn signal switches; each turn signal switch being in circuit with the lamp means on a different side of the vehicle; means, including a source of current, said control switch, and said turn signal switches in the normal position constituting a steady energizing circuit for said parking and tail lamp means; means, including said source, said stop lamp switch, and said turn signal switches in the normal position constituting a steady energizing circuit for said stop lamp means when said stop lamp switch is closed; and means, including said source, a current interrupter, and one of said turn signal switches in the operated position for intermittently energizing circuit for the signal lamp means and stop lamp means on one side of the vehicle; and means for conjointly operating both turn signal switches independently of said selective operating means therefor.

2. In a vehicle signaling system; a pair of parking lamp means; a pair of signal lamp means; one parking lamp means and one signal lamp means being grouped on each side of the front of the vehicle; a pair of tail lamp means; a pair of stop lamp means; one tail lamp means and one stop lamp means grouped on each side of the rear of the vehicle; a parking and tail lamp control switch; a stop lamp switch; a pair of turn signal switches each having a normal position and an operated position; means for selectively operating either of said turn signal switches; each turn signal switch being in circuit with the lamp means on a different side of the vehicle; means, including a source of current, said control switch, and said turn signal switches in the normal position constituting a steady energizing circuit for said parking and tail lamp means; means, including said source, said stop lamp switch, and said turn signal switches in the normal position constituting a steady energizing circuit for said stop lamp means when said stop lamp switch is closed; and means, including said source, a current interrupter, and one of said turn signal switches in the operated position for intermittently energizing circuit for the signal lamp means and stop lamp means on one side of the vehicle; each turn signal switch, in the operated position interrupting the steady energizing circuit for the parking and tail lamp means, on the associated side of the vehicle, by operation of said main control switch, and preventing steady energization of the stop lamp means on the associated side of the vehicle, when said stop lamp switch is closed; and means for conjointly operating both turn signal switches independently of said selective operating means therefor.

References Cited in the file of this patent
UNITED STATES PATENTS

| | | |
|---|---|---|
| 2,122,508 | Bell | July 5, 1938 |
| 2,186,911 | Erickson | Jan. 9, 1940 |
| 2,203,502 | Michel | June 4, 1940 |
| 2,238,394 | Murray | Apr. 15, 1941 |
| 2,267,743 | Murray | Dec. 30, 1941 |
| 2,321,803 | Falge | June 15, 1943 |
| 2,652,553 | Hollins | Sept. 15, 1953 |